UNITED STATES PATENT OFFICE.

JOHANNES EDUARD LANG, OF BERNE, SWITZERLAND.

MATERIAL FOR DEBASING ALCOHOL.

SPECIFICATION forming part of Letters Patent No. 618,207, dated January 24, 1899.

Application filed January 5, 1897. Serial No. 619,132. (No specimens.)

*To all whom it may concern:*

Be it known that I, JOHANNES EDUARD LANG, a citizen of the Republic of Switzerland, residing at 4 Christoffelgasse, Berne, in the Republic of Switzerland, have invented certain new and useful Improvements in Materials for Debasing Alcohol; and I do hereby declare the following to be a full, clear, and exact description of the invention, such as will enable others skilled in the art to which it appertains to make and use the same.

This invention relates to a new and improved medium for debasing or altering the nature of alcohol, more especially so as to render the same unfit for drinking purposes, which medium acts very effectually and the presence of which in alcohol thus treated can be readily proved and can only be separated from the alcohol with difficulty.

The substance usually employed at present for debasing alcohol is methylic alcohol, to which in many cases a small quantity of ordinary acetone (dimethylketone, $CH_3$-$CO$-$CH_3$) having its boiling-point at about 56° centigrade is added. The boiling-point of the methylic alcohol for debasing alcohol lies between 54° and 75° centigrade. This method of methylating the alcohol has the following disadvantages:

First. To render alcohol unfit for drinking purposes considerable quantities of methylic alcohol must be added.

Second. When diluted alcohol which has been debased by adding thereto methylic alcohol is filtered by means of charcoal, the impurities contained in the methylic alcohol are absorbed by the charcoal. Methylic alcohol in its pure form differs in taste but slightly from ethylic alcohol, and therefore does not act as a reliable debasing medium.

Third. The presence of methylic alcohol can be proved with certainty only if the same exists in large quantities.

Fourth. As methylic alcohol boils at 66° centigrade and acetone (dimethylketone) at 56° centigrade, the presence of a considerable amount of methylic alcohol would necessarily greatly reduce the boiling-point of the burning alcohol and consequently increase its explosive capacity.

Fifth. The ordinary acetone or the dimethylketone which presents so low a boiling-point can be easily removed from the alcohol by distillation or rectification.

The improved method of debasing alcohol employed according to this invention consists in using products of the homologous series of dimethylketone (ketones of higher degree)—for example, of the ketones $C_4H_8O$ (methylethylketone) and butyral, the ketones $C_5H_{10}O$ (methylpropylketone, diethylketone, methylisopropylketone), the ketones $C_6H_{12}O$ (methylbutylketone, ethylpropylketone, methylethylacetone, ethylisopropylketone, methylisobutylketone, &c.), or, speaking more generally, of all ketones having a boiling-point lying between 57° and 250° centigrade and which can be produced in the process of dry distillation of raw acetate of lime. These ketones of higher degree—that is to say, boiling at a temperature above 57° centigrade—just defined may be divided into two groups, namely: (a) the ketones readily soluble in water, for which group the ethylmethylketone may be considered as the main and typical product, and (b) those ketones which either dissolve but extremely little or are entirely insoluble in water, such as methylpropylketone, methylpseudobutylketone, (pinacolin,) methylisoamylketone, &c. These ketones of higher degree which are almost entirely insoluble in water are termed "acetone-oils," sometimes "ketone-oils." These substances, which have heretofore not been employed for altering the nature of alcohol, have proved inconvenient by-products generated in the manufacture of acetone from raw acetate of lime. Although the acetone industry is enabled to supply these products in large quantities, it may yet be expedient to here particularly point out an improved method for producing the same. It has been found that it is sufficient to oxidize the raw fusel-oils in order to produce the highest possible quantities of sebacic acids—such, for example, as propionic acid, the butane acids, pentane acid, &c. After these acids have been saturated with lime or baryta the raw sebacic acid salts thus generated are subjected to dry distillation, either separately or in connection with raw sebacic acetate of lime, whereby, besides dimethylketone, boiling at 56° centigrade, also ketones boiling at a higher degree are obtained. These products are very suitable for debasing alcohol, their composition being not materially different from ketones of the higher degree which in the manufacture of dimethylketone are obtained as by-products. The main advantages inherent in these improved ingredients are their highly debasing qualities, the rapid and reliable means for proving their presence, and the difficulty in removing such ingredients from alcohol treated therewith.

Numerous experiments have shown that in spite of many chemical and physical means being employed it has not been possible to remuneratively so remove these improved debasing ingredients from alcohol that their presence in brandy or drinks made therefrom cannot be proved.

The quantities of the debasing agent which I have found to be successful in practice are two to four per cent. of the liquid treated when using acetones readily soluble in water and one to two per cent. when using acetones insoluble or nearly insoluble in water.

What I claim, and desire to secure by Letters Patent, is—

1. The method herein described of debasing alcohol by the addition of homologues of dimethylketone such as ethylmethylketone and butyral, the ketones methylpropylketone, diethylketone, methylisopropylketone, methylbutylketone, ethylpropylketone ethylmethylketone, ethylisopropylketone and methylisobutylketone.

2. The method herein described of debasing alcohol by the addition of any ketones having a boiling-point between 57° and 250° centigrade and which are produced in the process of the dry distillation of raw acetate of lime as set forth.

In testimony whereof I have affixed my signature in presence of two witnesses.

JOHANNES EDUARD LANG.

Witnesses:
ED. V. WALDKIRCH,
P. H. SCHNEIDER.